United States Patent
Masselle et al.

(10) Patent No.: US 7,818,198 B2
(45) Date of Patent: Oct. 19, 2010

(54) AUTONOMIC TIME MANAGEMENT CALENDAR SYSTEM

(75) Inventors: Eric L. Masselle, Raleigh, NC (US); Patrick G. McGowan, Chapel Hill, NC (US); Christopher J. Paul, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 11/938,579

(22) Filed: Nov. 12, 2007

(65) Prior Publication Data

US 2009/0125365 A1    May 14, 2009

(51) Int. Cl.
G06Q 10/00 (2006.01)
G06F 17/10 (2006.01)
G06F 17/40 (2006.01)
G06F 19/00 (2006.01)

(52) U.S. Cl. ......................................................... 705/9
(58) Field of Classification Search ..................... 705/8, 705/9
See application file for complete search history.

(56) References Cited

U.S. PATENT DOCUMENTS

| | | | |
|---|---|---|---|
| 5,774,867 A | 6/1998 | Fitzpatrick et al. | |
| 5,790,974 A | 8/1998 | Tognazzini | |
| 6,640,230 B1 | 10/2003 | Alexander et al. | |
| 6,781,920 B2 * | 8/2004 | Bates et al. | 368/10 |
| 2002/0194048 A1 | 12/2002 | Levinson | |
| 2003/0149606 A1 * | 8/2003 | Cragun et al. | 705/8 |
| 2004/0014409 A1 | 1/2004 | Walters | |
| 2004/0054726 A1 | 3/2004 | Doss et al. | |
| 2004/0064355 A1 | 4/2004 | Dorenbosch et al. | |
| 2004/0078256 A1 | 4/2004 | Glitho et al. | |
| 2004/0172279 A1 | 9/2004 | Carolan et al. | |
| 2005/0033808 A1 | 2/2005 | Cheng et al. | |
| 2005/0034079 A1 | 2/2005 | Gunasekar et al. | |
| 2006/0143064 A1 * | 6/2006 | Mock et al. | 705/9 |
| 2006/0200374 A1 * | 9/2006 | Nelken | 705/9 |
| 2007/0239506 A1 * | 10/2007 | Jania et al. | 705/8 |

OTHER PUBLICATIONS

Van de Vonder et al.; A Classification of Predictive-Reactive Project Scheduling Procedures; May 15, 2007; Springer Science+Business Media; J Sched (2007) 10; pp. 195-207.*
Sen et al.; A Formal Study of Distsributed Meeting Scheduling; 1998; Kluwer Academic Publishers; Group Decision and Negotiation 7; pp. 265-289.*

* cited by examiner

Primary Examiner—Susanna M Diaz
Assistant Examiner—Ashley Y Chou
(74) Attorney, Agent, or Firm—Dillon & Yudell LLP (57) ABSTRACT

A method, system, and computer program product for autonomically managing a meeting calendar. An Autonomic Meeting Scheduling (AMS) utility detects a set of pre-scheduling data. The AMS utility generates an optimal meeting schedule based upon the set of pre-scheduling data. A meeting invitation is communicated to at least one meeting invitee. The AMS utility detects an invitation reply data from a meeting invitee. Based upon the pre-scheduling data and the invitation reply data, the AMS utility generates and outputs one of at least a meeting probability value (MPV) and a MPV curve. The MPV is a measure of how probable a scheduled meeting will occur. Moreover, a meeting owner may enable the AMS utility to determine whether the MPV has reached a threshold to execute a scheduling decision (i.e., retain a scheduled meeting, reschedule a meeting, or cancel/extinguish a scheduled meeting).

11 Claims, 5 Drawing Sheets

AUTONOMIC TIME MANAGEMENT CALENDAR SYSTEM

BACKGROUND OF THE INVENTION

1. Technical Field

The present invention relates in general to interface technologies and in particular to display interface technologies. Still more particularly, the present invention relates to an improved method and system for autonomically managing an electronic meeting calendar.

2. Description of the Related Art

The need to collaborate with other individuals is sometimes essential for team-driven projects to be completed. Such collaboration is largely achieved when one member of a team (e.g., a meeting owner) schedules a meeting with the various other members of the team (i.e., meeting invitees). However, the meeting owner's scheduling task becomes increasingly difficult as a result of the invitees' conflicting schedules. In some situations, a meeting invitee that is of high rank within an organization may receive more meeting invitations than is physically possible for that person to attend. As a result, negotiation is sometimes undertaken to draw a high-ranking invitee to accept the invitation to a particular meeting.

Under existing calendar systems, the acts of (a) scheduling a meeting and (b) determining the viability that the meeting will take place at the scheduled date and time are largely manual process that is performed by the meeting owner. While, existing calendar systems sometimes permit a meeting owner to view the individual schedules of the meeting invitees, the meeting owner is ultimately responsible for manually determining the most convenient time to schedule the meeting. In cases where there are schedule conflicts, the meeting owner must directly communicate with the conflicted invitees to arrive at a scheduling compromise. Other manual steps that the meeting owner must undertake in the scheduling and meeting viability determination processes include: (i) timely checking each returned response (i.e., acceptance or rejection) from the various invitees, (ii) tallying the returned responses, and (iii) determining whether a quorum of critical invitees has been reached. Following these manual tasks, if it is determined that the scheduled meeting will not take place, the meeting owner must go back through the same manual steps to re-schedule the meeting in a new time slot. Such methods and systems for managing a meeting calendar are not time efficient for a meeting owner.

SUMMARY OF THE ILLUSTRATIVE EMBODIMENTS

Disclosed is a method, system, and computer program product for autonomically managing a meeting calendar of a meeting owner and one or more meeting invitees. A set of pre-scheduling data is detected. The set of pre-scheduling data includes one or more of: the number of invitees, the identification of each invitee, the organizational importance of the meeting owner and each meeting invitee, the attendance priority of each invitee, the threshold for a scheduling decision, and schedule information of each invitee. An optimal meeting schedule is then generated based upon the pre-scheduling data. A meeting invitation is communicated to each meeting invitee. An invitation reply data is detected, which includes, but is not limited to an acceptance of the scheduled meeting and a declining of the scheduled meeting. At least one of a meeting probability value (MPV) and a MPV curve is generated. The MPV and MPV curve are two indicators that quantify the probability that the scheduled meeting will occur. Moreover, an automatic determination is made whether the MPV has reached a threshold for execution of a scheduling decision. If a threshold has been reached, a scheduling decision is outputted. Further responsive to the generation of a scheduling decision, a meeting schedule corresponding to the meeting owner and the meeting invitee is then updated.

According to one embodiment of the invention, a user override condition responsive to a meeting schedule overlap condition between meeting owners of unequal organizational importance is detected. According to yet another embodiment of the invention, historical meeting data regarding past meeting invitation decisions of particular invitees is detected. The historical meeting data is used to autonomically modify the weighting of the pre-scheduling data used to calculate the MPV. The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE ILLUSTRATIVE EMBODIMENTS

The illustrative embodiments provide a method, system, and computer program product for autonomically managing a meeting calendar. In particular, an autonomic meeting scheduling (AMS) utility determines the probability of whether a scheduled meeting will occur. The probability is determined by calculating a meeting probability value (MPV), which is based upon a ratio of a total number of invitees versus a total number of accepted invitations. In addition, a set of weighted factors are applied to this ratio, based upon various meeting criteria attributes, such as: (i) the criticality of a particular invitee's meeting acceptance and (ii) the ranking of the particular invitee in an organizational hierarchy. The AMS utility also collects and utilizes historical meeting data regarding past meeting invitation decisions of particular invitees (i.e., acceptances/rejections) to autonomically modify the weighting of the factors used to calculate the MPV.

The AMS utility outputs the MPV or an MPV curve (i.e., a curve that plots the MPV over the life cycle of a meeting from invitation date to the actual meeting date) to the meeting owner, as well as to the meeting invitees. The outputting of the MPV/MPV curve is intended to provide the meeting owner and meeting invitees with a current statistical probability of whether a meeting will actually occur as originally scheduled. In the case of the meeting invitee, the meeting invitee can thus make a better informed decision whether to accept or reject the meeting invitation. At the same time, the meeting owner is made aware of the likelihood of the AMS utility suggesting or actually executing the retention, cancellation, and/or rescheduling of the scheduled meeting date.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
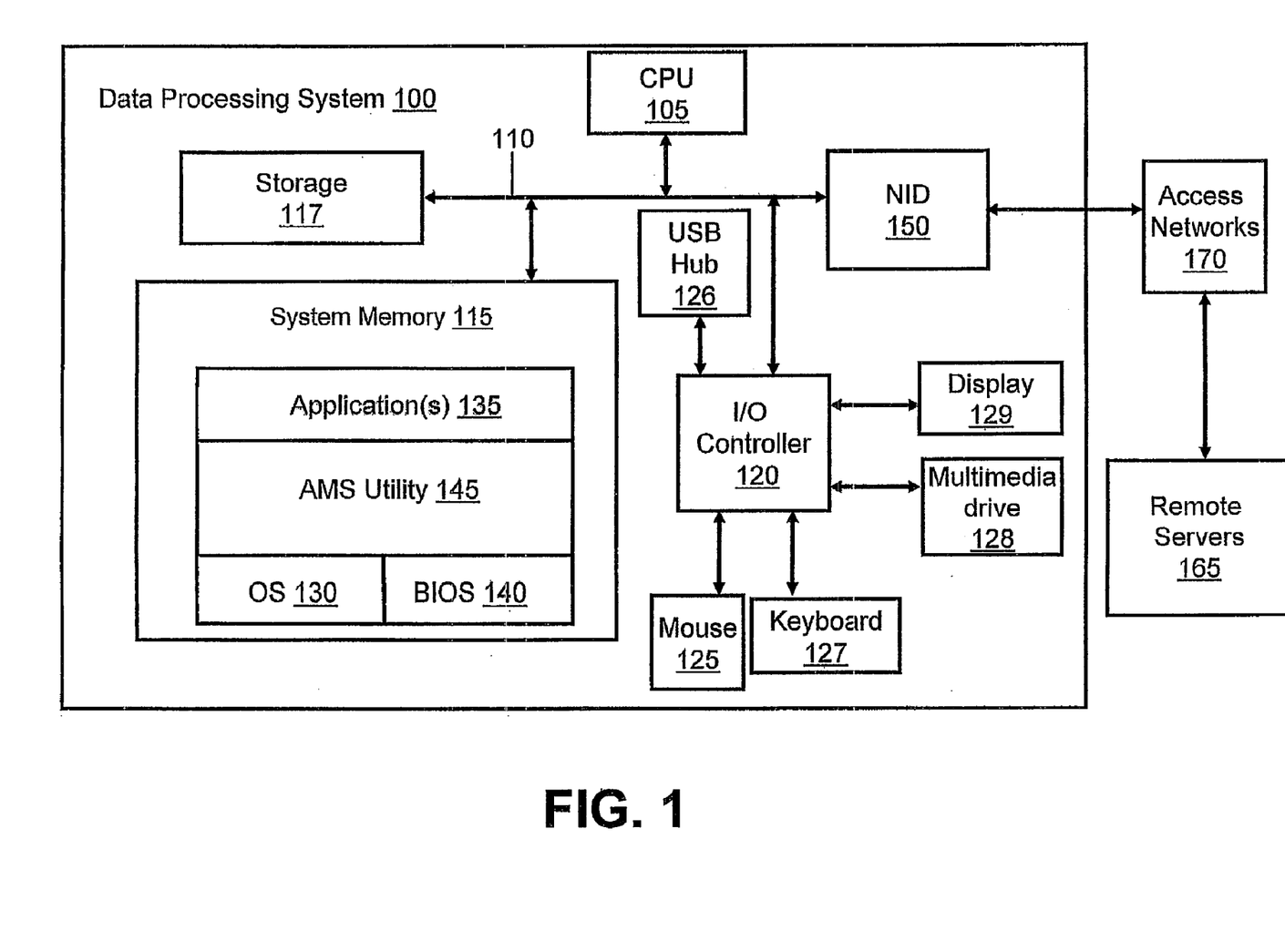
FIG. 1 depicts a high level block diagram of an exemplary data processing system, according to an embodiment of the invention.

With reference now to FIG. 1, depicted is a block diagram representation of data processing system (DPS) 100. DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, multimedia drive 128 (e.g., CDRW or DVDRW drive) and Universal Serial Bus (USB) hub 126 are illustrated, coupled to I/O controller 120. Multimedia drive 128 and USB hub 126 may operate as both input and output (storage) mechanisms. DPS 100 also comprises storage 117, within which data/instructions/code may be stored. DPS 100 is also illustrated with network interface device (NID) 150 coupled to system bus 110. NID 150 enables DPS 100 to connect to one or more remote servers 165 via access networks 170, such as the Internet.

In the described embodiments, when access network 170 is the Internet, access network 170 represents a worldwide collection of networks and gateways that utilize the Transmission Control Protocol/Internet Protocol (TCP/IP) suite of protocols to communicate with one another. Of course, network access may also be provided via a number of different types of networks, such as an intranet, an Ethernet, a Local Area Network (LAN), a Virtual Private Network (VPN), or other Wide Area Network (WAN) other than the Internet, for example.

Notably, in addition to the above described hardware components of DPS 100, various features of the invention are completed via software (or firmware) code or logic stored within system memory 115, in other storage (e.g., storage 117), or stored remotely in memory of server 165 and executed by CPU 105. System memory 115 is defined as a lowest level of volatile memory (not shown), including, but not limited to, cache memory, registers, and buffers. In one embodiment, data/instructions/code stored in remote memory of remote server 165 populates the system memory 115, which is also coupled to system bus 110. In another embodiment, the data/instructions/code are stored and executed remotely from remote server 165 and accessed by DPS 100 via NID 150.

Illustrated within system memory 115 are a number of software/firmware components, including operating system (OS) 130 (e.g., Microsoft Windows®, a trademark of Microsoft Corp; or GNU®/Linux®, registered trademarks of the Free Software Foundation and The Linux Mark Institute; or Advanced Interactive eXecutive -AIX-, registered trademark of International Business Machines—IBM), applications 135, Basic Input/Output System (BIOS) 140 and Autonomic Meeting Scheduling (AMS) utility 145. For simplicity, AMS utility 145 is illustrated and described as a stand alone or separate software/firmware component, which is stored in system memory 115 to provide/support the specific novel functions described herein.

CPU 105 executes AMS utility 145 as well as OS 130, which supports the user interface features of AMS utility 145. In the illustrative embodiment, AMS utility 145 facilitates the autonomic management of a meeting calendar. Among the software code/instructions provided by AMS utility 145, and which are specific to the invention, are code for: (a) detecting a set of pre-scheduling data from a meeting owner and at least one meeting invitee; (b) generating an optimal meeting schedule based upon the pre-scheduling data; (c) communicating a meeting invitation (d) detecting invitation reply data; (e) generating and outputting one of at least a meeting probability value (MPV) and a MPV curve based on pre-scheduling data and invitation reply data; (f) automatically determining whether MPV has reached a threshold to execute a scheduling decision; and (g) outputting the scheduling decision. In response to the outputting of the scheduling decision, AMS utility 145 also includes code for (h) updating an invitee schedule and an owner schedule. Moreover, according to one alternative embodiment, AMS utility 145 detects a user override condition in the event of a meeting schedule overlap condition between meeting owners of unequal organizational importance.

For simplicity of the description, the collective body of code that enables these various features is referred to herein as AMS utility 145. According to the illustrative embodiment, when CPU 105 executes AMS utility 145, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM System p5, a product of International Business Machines Corporation in Armonk, N.Y., running the AIX operating system or LINUX operating system.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
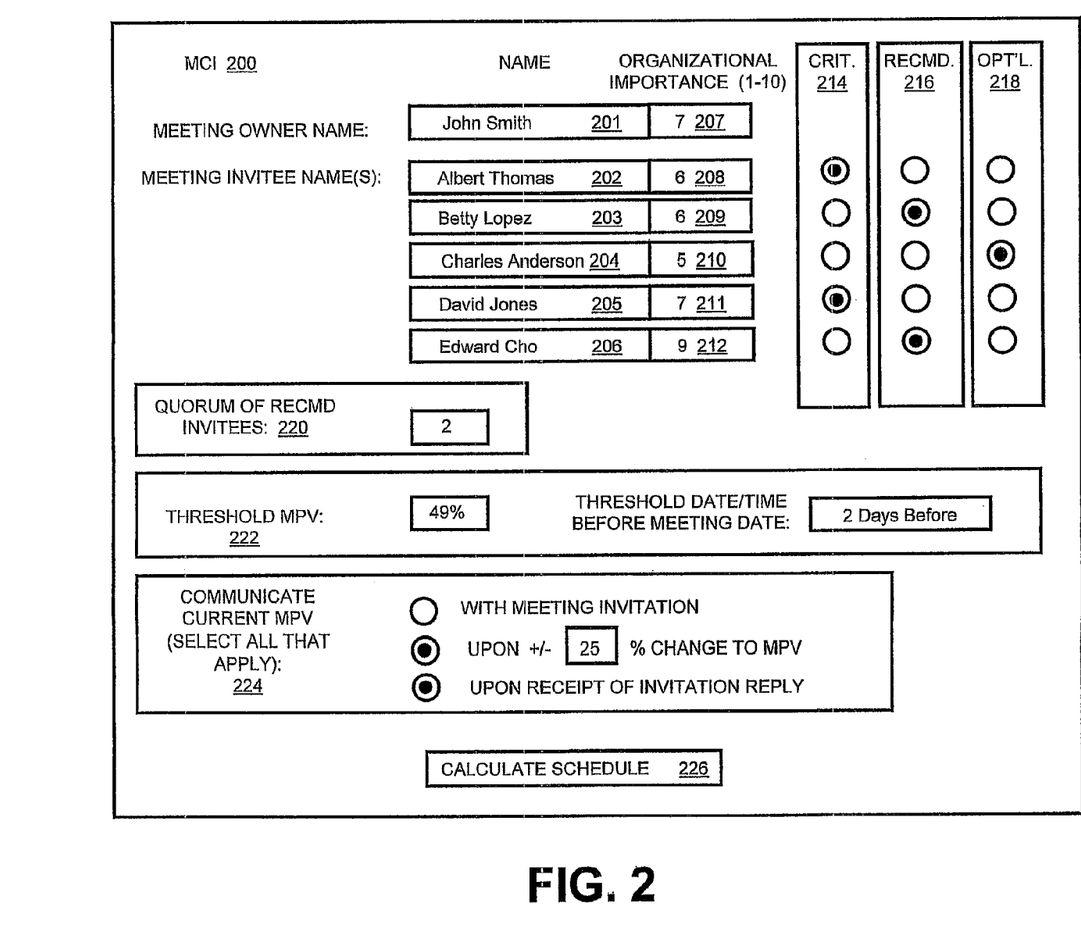
FIG. 2 shows an exemplary graphical display of a meeting criteria interface (MCI), that is useful for understanding the invention.

With reference now to FIG. 2, there is depicted an exemplary Meeting Criteria Interface (MCI) 200, that includes various field boxes and radio buttons which, when respectively completed and selected by a meeting owner, provide the necessary pre-scheduling data for the execution of AMS utility 145 (FIG. 1). Among the pre-scheduling data that can be inputted in MCI 200 are: (a) the name of the meeting owner (box 201), (b) the name(s) of a meeting invitee(s) (boxes 202-206), (c) the organizational importance of the meeting owner and the meeting invitee(s) (boxes 207-212), (d) the attendance priority of invitee(s) (i.e., critical attendance radio buttons 214, recommended attendance radio buttons 216, optional attendance radio buttons 218), (e) the total number of invitees, and (f) the schedule information of each invitee. For purposes of describing the embodiments herein, meeting invitees that are associated with critical attendance radio button 214 shall be referred to as critical invitees or invitees of critical priority. Further, meeting invitees that are associated with recommended attendance radio button 216 shall be referred to as recommended invitees or invitees of recommended priority. Further still, meeting invitees that are associated with optional attendance radio button 218 shall be referred to as optional invitees or invitees of optional priority.

In addition, a quorum field box 220 is displayed so that meeting owner sets the minimum number of recommended invitees that are required to accept a meeting invitation for the scheduled meeting to occur. MCI 200 also includes a threshold minimum probability value (MPV) field box 222. As used herein, MPV refers to a measure of how likely a scheduled meeting will occur. With reference to threshold MPV box 222, the meeting owner sets a pre-determined MPV threshold and a date/time threshold for AMS utility 145 to execute a scheduling decision. One of the scheduling decisions that can result is: an actual or recommended retention of the meeting time slot, rescheduling of the meeting to a new meeting time slot, and cancellation of the meeting.

MCI 200 also includes MPV communication box 224, which provides the meeting owner with choices regarding the method of communicating a current MPV to invitees. Choices include communicating the current MPV: (a) when a meeting invitation is sent to each invitee, (b) when the MPV changes by a pre-determined value, and (c) when the meeting owner receives an invitation reply from an invitee. Once all the fields and radio buttons of MCI 200 have been completed, the meeting owner requests AMS utility 145 to calculate a meeting schedule by selecting execution box 226.

In the example illustrated in FIG. 2, the meeting owner (i.e., John Smith 201) enters the names of each meeting invitee (e.g., Albert Thomas, Betty Lopez, Charles Anderson, David Jones, and Edward Cho, 202-206). Moreover, the meeting owner selects the attendance priority level of each meeting invitee in boxes 214, 216, and 218. According to the example shown in FIG. 2, meeting invitees Albert Thomas 202 and David Jones 205 have been designated as being of critical priority in attending the meeting. This means that the scheduled meeting cannot be conducted without the required attendance of these two individuals. Thus, if any one of the designated critical invitees declines the meeting invitation, the meeting will not occur at the scheduled timeslot.

Moreover, meeting invitees Betty Lopez 203 and Edward Cho 206 have been designated as being of recommended priority in attending the scheduled meeting. Unless a particular quorum (i.e., minimum number) of invitees of recommended priority is required by the meeting owner to accept a meeting, the acceptance of invitees of recommended priority is not critical to the viability of the meeting. In the example shown in FIG. 2, the meeting owner has set in quorum field box 220 a minimum number of two recommended invitees that are required to accept a meeting invitation. This means that if either Betty Lopez 203 or Edward Cho 206 declines to attend the scheduled meeting, the meeting cannot occur at the scheduled timeslot since both invitees are needed to attain the quorum of recommended invitees. Lastly, meeting invitee Charles Anderson 204 has been designated by the meeting owner as being of optional priority. Any declining of a meeting by an invitee that is designated of optional priority will not affect the viability of a scheduled meeting.

Figure 3:
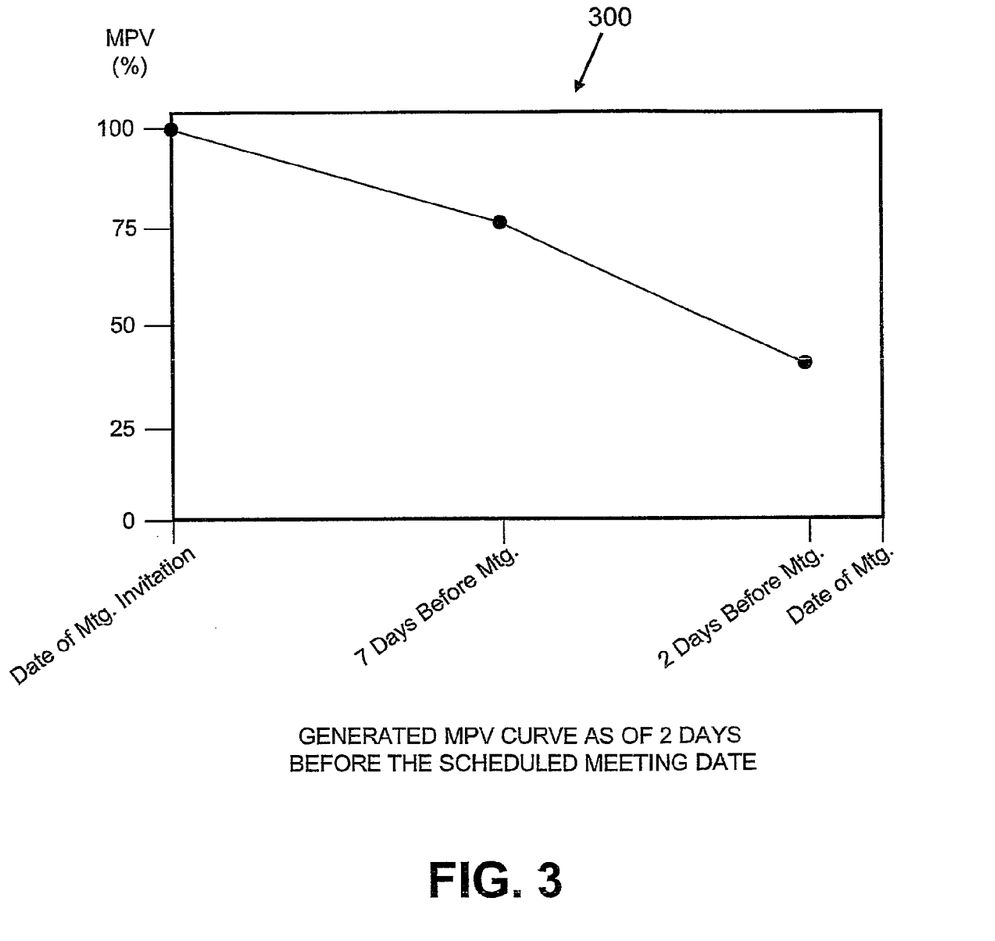
FIG. 3 shows an exemplary graphical display of a meeting probability value (MPV) curve, according to an embodiment of the invention.

Referring now to FIG. 3, an exemplary graphical representation 300 of a MPV curve is shown. As used herein, an MPV curve is a plotted graph that tracks the MPV percentage over a meeting's lifecycle. A meeting lifecycle refers to the time period from the first meeting invitation that is communicated to an invitee, to the scheduled meeting date. According to the example shown in FIG. 3, the MPV curve displays MPV data as of seven days and two days before the scheduled meeting date.

Figure 4A:
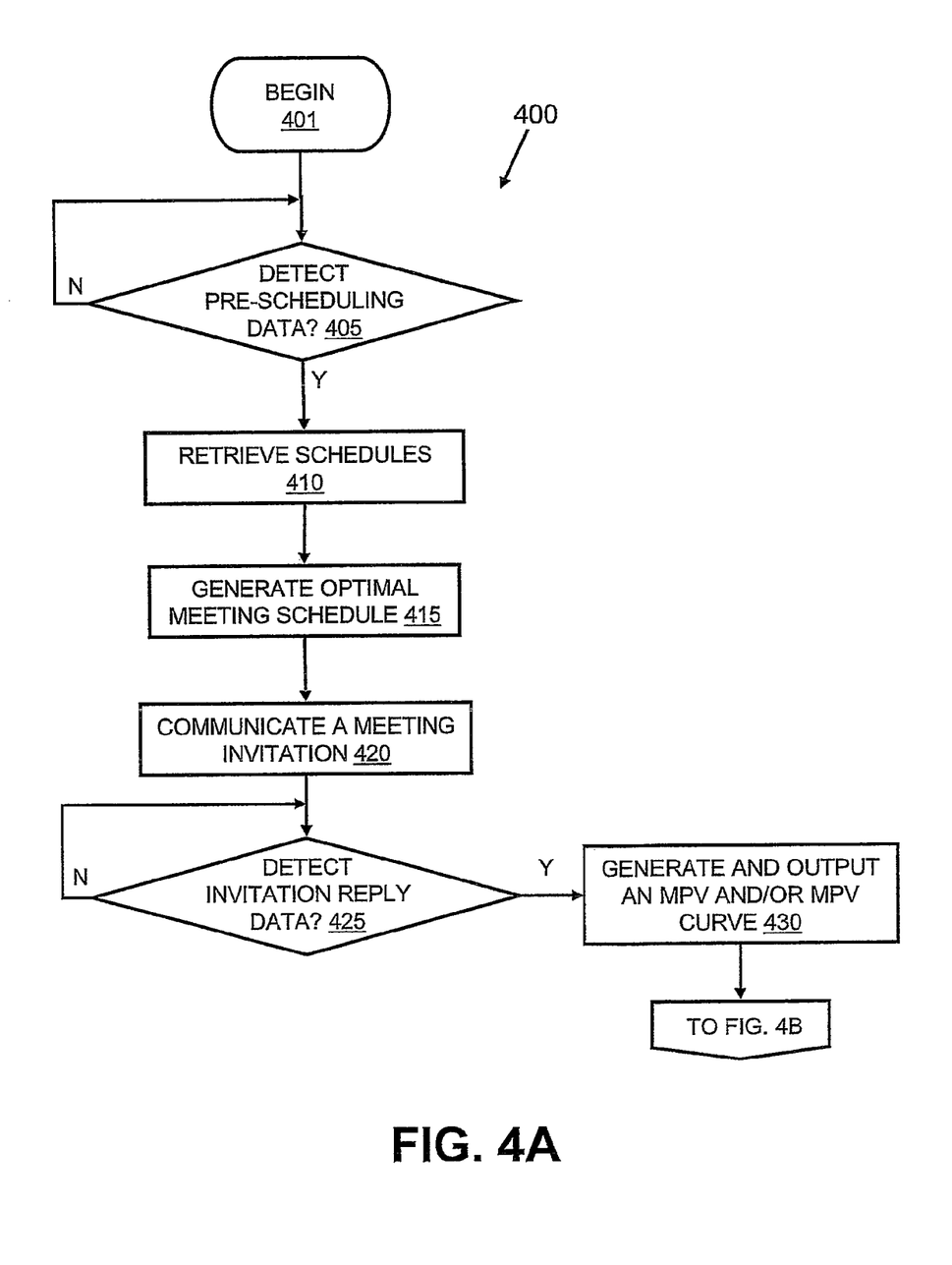
FIGS. 4A and 4B represent individual parts of a high level logical flowchart of an exemplary method of managing a meeting calendar, according to an embodiment of the invention.
Figure 4B:
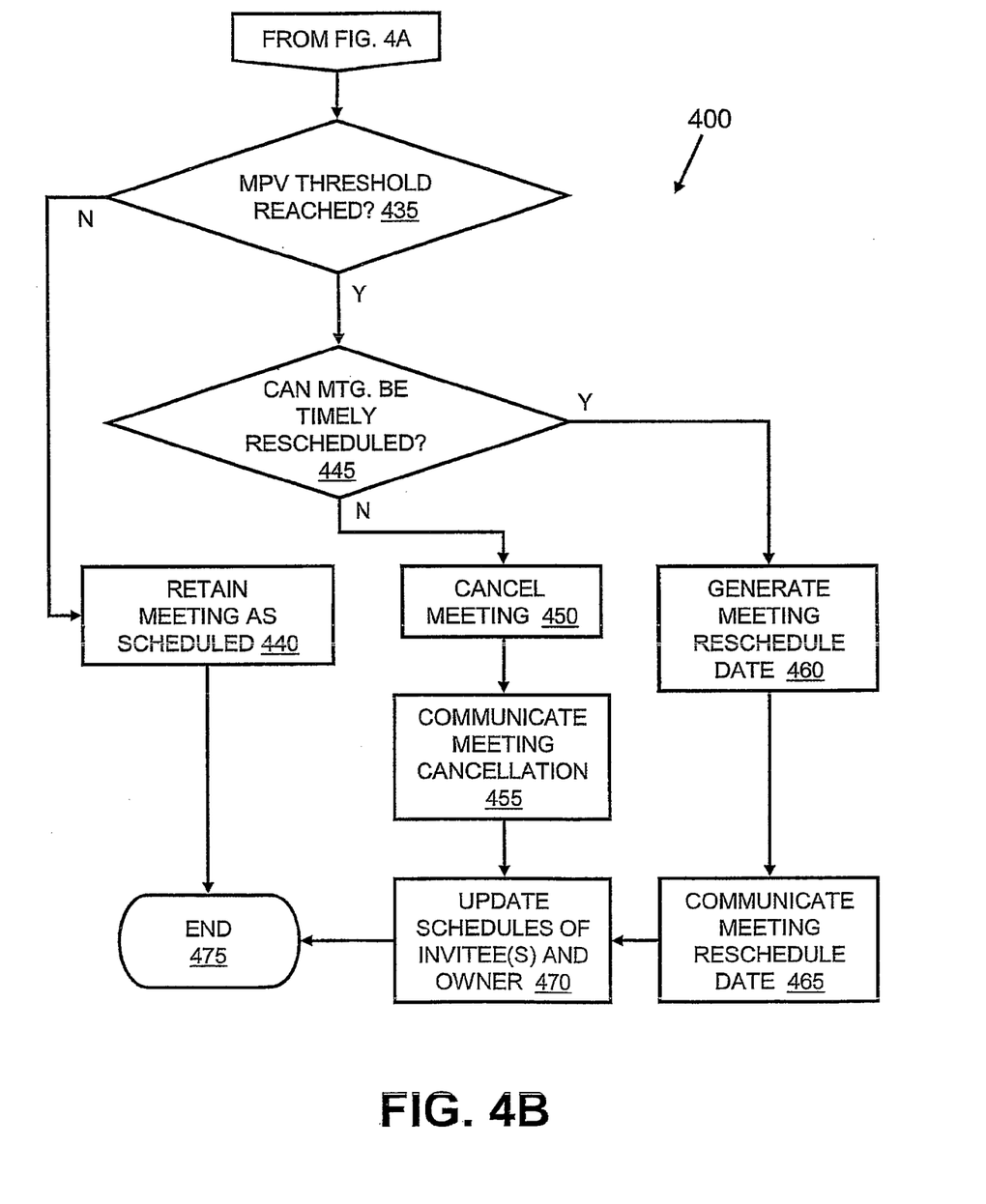

FIGS. 4A and 4B represent portions of flow chart 400 illustrating the exemplary method steps used to implement and utilize the method of autonomically managing a meeting calendar, according to an illustrative embodiment of the invention. Referring now to FIG. 4A, after initiator block 401, AMS utility 145 (FIG. 1) detects a set of pre-scheduling data (block 405). In one embodiment, the set of pre-scheduling data may be entered by a user or dynamically presented by software. The pre-scheduling data is used by AMS utility 145 to calculate: (i) a meeting schedule and (ii) the probability of the meeting schedule taking place. In particular, the pre-scheduling data includes, but is not limited to the data provided by the meeting owner (as discussed above with reference to FIG. 2). The pre-scheduling data includes, but is not limited to (a) the name of the meeting owner (box 201), (b) the name(s) of a meeting invitee(s) (boxes 202-206), (c) the organizational importance of the meeting owner and the meeting invitee(s) (boxes 207-212), (d) the attendance priority of invitee(s) (i.e., critical attendance radio buttons 214, recommended attendance radio buttons 216, optional attendance radio buttons 218), (e) the total number of invitees, and (f) the schedule information of the meeting owner and each invitee.

The organizational importance of the meeting owner and the meeting invitee(s) is indicated by a numerical ranking of a scale of 1-10 (i.e., 10 indicating the highest importance within an organization). This numerical ranking can be assigned by the meeting owner, or in the alternative can be automatically calculated and displayed in MCI 200 based on the organization's pre-assigned rankings associated with each meeting individual (i.e., meeting owner and meeting invitee(s)). Once the identity of the meeting owner and the meeting invitee(s) has been identified, AMS utility 145 retrieves time schedules corresponding to the meeting owner and the meeting invitee(s), as depicted in block 410. AMS utility 145 utilizes the pre-scheduling data to generate an optimal meeting schedule, as depicted in block 415. An optimal meeting schedule is a meeting schedule that potentially accommodates the meeting owner and all meeting invitee(s).

Once the optimal meeting schedule is generated, AMS utility 145 communicates a meeting invitation to the meeting invitee(s), as depicted in block 420. In this regard, the invention is not limited to any particular means for communicating the meeting invitation. Means of communication include, but are not limited to, e-mail, telephone voice mail, text message, instant messaging, and facsimile. In addition to communicating the meeting invitation, AMS utility 145 can also contemporaneously communicate current MPV data to the meeting invitee(s). This additional feature allows meeting invitees to make a more informed decision as to the viability of the meeting to which they are invited to attend. This feature can be enabled (or disabled as shown in FIG. 2) depending upon the preferences of the meeting owner when selecting the various communications options in MPV communication box 224.

After communicating the meeting invitations, AMS utility 145 awaits detection of invitation reply data from the meeting invitee(s), as depicted in block 425. The invitation reply data include (i) an acceptance of the meeting or (ii) a declining of the meeting, as scheduled. Based on the pre-scheduled data and detected invitation reply data, AMS utility 145 generates and outputs a MPV and/or a MPV curve, as depicted in block 430. Generally, the calculation of the MPV is based upon a ratio of a total number of invitees versus a total number of accepted invitations. However, according to the embodiment shown in FIG. 2, a set of weighted factors are applied to this ratio, based upon various meeting criteria attributes such as: (i) the importance of a particular invitee's meeting acceptance (i.e., meeting priority level assigned to the various invitees) and (ii) the ranking of the particular invitee in an organizational hierarchy.

In addition to factoring the attendance priority level of an invitee, the MPV is also determined by the relative importance an invitee has within an organizational hierarchy. Within an organization, individuals with higher ranking/importance typically have a higher volume of meeting invitations as compared to individuals with a lower ranking/importance. By factoring the organizational importance/ranking of invitees in the MPV, a more accurate probability of a meeting's viability is calculated. In this regard, the higher the organizational ranking of a meeting invitee, the slower the decay of the MPV over the lifecycle of the scheduled meeting because more time is often required before the higher-ranking individuals accept/decline a meeting invitation.

According to another embodiment, AMS utility 145 also collects historical meeting data regarding past meeting invitation decisions of particular invitees (i.e., acceptances/rejections) to autonomously modify the weighting of the factors used to calculate the MPV. Referring to the example shown in FIG. 2, AMS utility 145 may determine that David Jones 205 (a meeting invitee of critical priority) takes, historically, an average of three days from an initial meeting invitation to accept a meeting invitation. As a result, the MPV value (based on David Jones' lack of response) will not drop significantly for the first three days since the initial invitation of David Jones. However, if David Jones has not accepted the meeting invitation by the fourth day of receiving the invitation, the MPV value (based on David Jones' lack of response) will commence to decay at an accelerated rate for the remainder of the meeting's lifecycle.

Referring now to decision block 435 of FIG. 4B, AMS utility 145 determines whether the MPV has reached a threshold for execution of a scheduling decision. This threshold can be defined in various threshold forms. A first threshold form is one that is defined when an invitee of critical priority has declined a meeting invitation. A second threshold form is one that is defined when a quorum of invitees of recommended priority has not been reached. A third threshold form is one which is defined by the meeting owner under two categories: (i) a MPV value threshold (e.g., MPV=49%, in FIG. 2) and (ii) a threshold date/time before meeting date (e.g., 2 days before scheduled meeting date, in FIG. 2). Thus, under the third threshold form, a meeting owner instructs AMS utility 145 to make a scheduling decision (i.e., retain, reschedule, and/or cancel the scheduled meeting) upon reaching the set threshold by a set date/time. Referring to the example shown in FIG. 2, if two days before the scheduled meeting date AMS utility 145 detects that the MPV has fallen below a value of 50%, AMS utility 145 automatically cancels the scheduled meeting and reschedules for another timeslot that is open to all meeting individuals. If the MPV has not reached a threshold for execution of a scheduling decision, the method proceeds to block 440, which retains the meeting as scheduled. According to another embodiment, instead of automatically cancelling the scheduled meeting when an MPV value threshold has been reached, AMS utility 145 can suggest a rescheduling of the original meeting and prompt the meeting owner to select a secondary timeslot for the rescheduled meeting.

If the MPV has reached a threshold for execution of a scheduling decision by a set date/time, the process continues to decision block 445, in which AMS utility 145 determines whether the originally scheduled meeting can be timely rescheduled. A timely rescheduled meeting is a meeting which (i) can be changed to a timeslot that is available to both meeting owner and meeting invitees and (ii) does not frustrate or conflict with the original purpose of the meeting. If the meeting cannot be timely rescheduled, AMS utility 145 cancels the meeting (block 450) and communicates the meeting cancellation to the meeting individuals (block 455). If the meeting can be timely rescheduled, AMS utility 145 generates a meeting reschedule date (block 460) based upon the meeting individual's schedules and the pre-scheduling data and communicates the meeting reschedule date to the meeting individuals (block 465). Once a cancellation or a rescheduling of a meeting has been communicated, AMS utility 145 updates the schedules of the meeting individuals to reflect the meeting scheduling change, as depicted in block 470. From blocks 440 and 470 the process ends at terminator block 475.

According to an alternative embodiment of the invention, AMS utility 145 detects a meeting schedule overlap condition. As used herein, a meeting overlap condition occurs when at least a portion of a scheduled meeting's timeslot overlaps with a timeslot of another scheduled meeting. For example, two meeting owners of unequal organizational importance/ranking have scheduled their respective meetings at the same time and have invited a common invitee. Assuming all other things being equal, AMS utility 145 includes an automatic conflict resolution feature that would, by default, grant the meeting owner having the higher organizational rank the ability to invite the common invitee. The meeting owner having the lower organizational rank would not be allowed to schedule a meeting at the conflicting timeslot if the common invitee is invited.

Under this new embodiment, AMS utility 145 overrides the default outcome of the automatic conflict resolution if a user override condition is detected as pre-scheduling data. A user override condition occurs when a meeting owner of a conflicting meeting expressly selects to override a potential default outcome of the automatic conflict resolution. In this regard, it should be understood that one or more meeting owners of conflicting meetings can select a user override condition. For example, if both conflicting meeting owners select a user override condition, an override condition would be negated and the default outcome would result.

In the flow chart 400 above (FIGS. 4A-4B), one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, and the like, thereby making an article of manufacture in accordance with the invention. The article of manufacture containing the programming code is used by either executing the code directly from the storage device, by copying the code from the storage device into another storage device such as a hard disk, RAM, and the like, or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVD ROMs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a computing device, a method for autonomically managing a meeting calendar comprising:
   a processor of the computing device executing a scheduling utility to perform the steps of:
   detecting a set of pre-scheduling data;
   generating an optimal meeting schedule based upon the pre-scheduling data;
   communicating a meeting invitation;
   detecting an invitation reply data;
   generating and outputting to a meeting owner and meeting invitees a meeting probability value (MPV) based on pre-scheduling data and invitation reply data;
   automatically determining, at a pre-set date or time before the scheduled meeting date, whether MPV has reached a threshold by the preset data and time to execute a scheduling decision, wherein the scheduling decision is a decision from among retaining the meeting, rescheduling the meeting and canceling the meeting and the scheduling decision is scheduled to be made by a pre-set date or time before the meeting is to occur;
   in response to the MPV reaching a threshold, generating the scheduling decision;
   responsive to generating the scheduling decision, updating a meeting schedule of the meeting invitee and the meeting owner; and
   providing the updated meeting schedule within the respective meeting calendar of the meeting owner and the meeting invitee;
   wherein the set of pre-scheduling data includes at least one of: an organizational importance of the meeting owner and of each meeting invitee and a threshold for scheduling decision, wherein a more accurate probability of a meeting's viability is calculated by factoring in the organizational importance/ranking of the invitees in the MPV calculation, such that the higher the organizational ranking of a meeting invitee, the slower a decay of the MPV over a lifecycle of the scheduled meeting to allow more time for a higher ranking invitee to accept or decline the meeting invitation.

2. The method of claim 1, the method further comprising:
   detecting a user override condition responsive to a meeting schedule overlap condition for a common invitee between meeting owners of unequal organizational importance; and
   in response to detecting the user override condition from a meeting owner of lower organizational importance, enabling the meeting owner of lower organizational importance to invite the common invitee by overriding a default scheduling of the common invitee to be scheduled to attend a different meeting with a meeting owner of higher organizational importance;
   wherein the user override condition results when the meeting owner of a conflicting meeting expressly selects to override a potential default outcome of an automatic conflict resolution, whereby the potential default outcome results in a meeting owner of higher organizational importance being granted the ability to invite the common invitee.

3. The method of claim 1, further comprising:
   utilizing historical meeting data regarding past meeting invitation decisions of particular invitees to autonomically modify a weighting of the pre-scheduling data used to calculate the MPV; and
   calculating the MPV based on a ratio of total number of invitees versus a total number of accepted invitations and applying a set of weighted factors to the ratio based on meeting criteria attributes including: (a) importance of an invitee's meeting acceptance or meeting priority level assigned to the invitee and (b) a ranking of a particular invitee within an organizational hierarchy.

4. A computer system comprising:
   a processor unit;
   a memory coupled to the processor unit; and
   an Autonomic Meeting Scheduling (AMS) utility executing on the processor unit and having executable code for:

detecting a set of pre-scheduling data;
generating an optimal meeting schedule based upon the pre-scheduling data;
communicating a meeting invitation;
detecting an invitation reply data;
generating and outputting to a meeting owner and meeting invitees a meeting probability value (MPV) based on pre-scheduling data and invitation reply data;
automatically determining, at a pre-set date or time before the scheduled meeting date, whether MPV has reached a threshold by the preset data and time to execute a scheduling decision, wherein the scheduling decision is a decision from among retaining the meeting, rescheduling the meeting and canceling the meeting and the scheduling decision is scheduled to be made by a pre-set date or time before the meeting is to occur;
in response to the MPV reaching a threshold, generating the scheduling decision; and
responsive to generating the scheduling decision, updating a meeting schedule of each meeting invitee and the meeting owner;
wherein the set of pre-scheduling data includes at least one of: an organizational importance of the meeting owner and of each meeting invitee and a threshold for scheduling decision, wherein a more accurate probability of a meeting's viability is calculated by factoring in the organizational importance/ranking of the invitees in the MPV calculation, such that the higher the organizational ranking of a meeting invitee, the slower a decay of the MPV over a lifecycle of the scheduled meeting to allow more time for a higher ranking invitee to accept or decline the meeting invitation.

5. The computer system of claim 4, the AMS utility further having executable code for:
detecting a user override condition responsive to a meeting schedule overlap condition between meeting owners of unequal organizational importance; and
in response to detecting a user override condition from a meeting owner of lower organizational importance, enabling the meeting owner of lower organizational importance to invite a common invitee;
wherein the user override condition results when the meeting owner of a conflicting meeting expressly selects to override a potential default outcome of an automatic conflict resolution, whereby the potential default outcome results in a meeting owner of higher organizational importance being granted the ability to invite the common invitee.

6. The computer system of claim 4, wherein the set of pre-scheduling data that is used by AMS utility includes at least one of: a number of invitees, an identification of each invitee, an organizational importance of the meeting owner and each meeting invitee, an attendance priority of each invitee, a threshold for scheduling decision, and a schedule information of each invitee.

7. The computer system of claim 4, the AMS utility further having executable code for:
utilizing historical meeting data regarding past meeting invitation decisions of particular invitees to autonomically modify a weighting of the pre-scheduling data used to calculate the MPV; and
calculating the MPV based on a ratio of total number of invitees versus a total number of accepted invitations and applying a set of weighted factors to the ratio based on meeting criteria attributes including: (a) importance of an invitee's meeting acceptance or meeting priority level assigned to the invitee and (b) a ranking of a particular invitee within an organizational hierarchy.

8. A computer program product comprising:
a computer storage medium; and
program code on the computer storage medium that when executed performs the functions of:
detecting a set of pre-scheduling data;
generating an optimal meeting schedule based upon the pre-scheduling data;
communicating a meeting invitation;
detecting an invitation reply data;
generating and outputting to a meeting owner and meeting invitees a meeting probability value (MPV) based on pre-scheduling data and invitation reply data;
automatically determining, at a pre-set date or time before the scheduled meeting date, whether MPV has reached a threshold by the preset data and time to execute a scheduling decision, wherein the scheduling decision is a decision from among retaining the meeting, rescheduling the meeting and canceling the meeting and the scheduling decision is scheduled to be made by a pre-set date or time before the meeting is to occur;
in response to the MPV reaching a threshold, generating the scheduling decision; and
responsive to generating the scheduling decision, updating a meeting schedule of a meeting invitee and the meeting owner;
wherein the set of pre-scheduling data includes at least one of: an organizational importance of the meeting owner and of each meeting invitee and a threshold for scheduling decision, wherein a more accurate probability of a meeting's viability is calculated by factoring in the organizational importance/ranking of the invitees in the MPV calculation, such that the higher the organizational ranking of a meeting invitee, the slower a decay of the MPV over a lifecycle of the scheduled meeting to allow more time for a higher ranking invitee to accept or decline the meeting invitation.

9. The computer program product of claim 8, the program code further provides the functions of:
detecting a user override condition responsive to a meeting schedule overlap condition between meeting owners of unequal organizational importance; and
in response to detecting a user override condition from a meeting owner of lower organizational importance, enabling the meeting owner of lower organizational importance to invite a common invitee;
wherein the user override condition results when the meeting owner of a conflicting meeting expressly selects to override a potential default outcome of an automatic conflict resolution, whereby the potential default outcome results in a meeting owner of higher organizational importance being granted the ability to invite the common invitee.

10. The computer program product of claim 8, wherein the set of pre-scheduling data includes at least one of:
a number of invitees, an identification of each invitee, an organizational importance of the meeting owner and each meeting invitee, an attendance priority of each invitee, a threshold for scheduling decision, and a schedule information of each invitee.

11. The computer program product of claim 8, the program code further provides the function of:

utilizing historical meeting data regarding past meeting invitation decisions of particular invitees to autonomically modify a weighting of the pre-scheduling data used to calculate the MPV; and calculating the MPV based on a ratio of total number of invitees versus a total number of accepted invitations and applying a set of weighted factors to the ratio based on meeting criteria attributes including: (a) importance of an invitee's meeting acceptance or meeting priority level assigned to the invitee and (b) a ranking of a particular invitee within an organizational hierarchy.

* * * * *